US009676639B2

(12) United States Patent
Carmignani et al.

(10) Patent No.: US 9,676,639 B2
(45) Date of Patent: *Jun. 13, 2017

(54) RECOVERY OF RETROGRADE SOLUBLE SOLUTE FOR FORWARD OSMOSIS WATER TREATMENT

(71) Applicant: Trevi Systems Inc., Petaluma, CA (US)

(72) Inventors: Gary Carmignani, Occidental, CA (US); Steve Sitkiewitz, Sebastopol, CA (US); John Wilfred Webley, Santa Rosa, CA (US)

(73) Assignee: TREVI SYSTEMS INC., Petaluma, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/923,198

(22) Filed: Oct. 26, 2015

(65) Prior Publication Data

US 2016/0039685 A1    Feb. 11, 2016

Related U.S. Application Data

(63) Continuation of application No. 13/454,062, filed on Apr. 23, 2012, now Pat. No. 9,216,917.
(Continued)

(51) Int. Cl.
*B01D 63/00* (2006.01)
*B01D 61/00* (2006.01)
(Continued)

(52) U.S. Cl.
CPC ............ *C02F 1/445* (2013.01); *B01D 21/262* (2013.01); *B01D 21/267* (2013.01);
(Continued)

(58) Field of Classification Search
CPC ...... C02F 1/445; C02F 1/441; C02F 2103/08; C02F 1/44; C02F 2303/10; C02F 1/52; C02F 9/08; B01D 61/02; B01D 61/08
See application file for complete search history.

(56) References Cited

U.S. PATENT DOCUMENTS 3,721,621 A    3/1973    Hough
4,335,001 A    6/1982    Aurelle et al.
(Continued)

FOREIGN PATENT DOCUMENTS

EP    2686081 A1    1/2014
JP    H08309351 A    11/1996
(Continued)

OTHER PUBLICATIONS

U.S. Appl. No. 11/632,994, filed Jan. 22, 2007, entitled "Water Flooding Method," Inventor(s): Ian Ralph Collins of the UK, pp. 1-40.
(Continued)

*Primary Examiner* — Ana Fortuna
(74) *Attorney, Agent, or Firm* — Polsinelli PC

(57) ABSTRACT

Improved systems and processes for forward osmosis water purification or desalination are herein disclosed. According to one embodiment a process for purifying contaminated water is provided wherein a contaminated feed solution stream comprising water and with a first osmotic pressure is passed through a semipermeable membrane to a draw side having a draw solution stream with a second osmotic pressure on a draw side of the semipermeable membrane. The diluted draw solution stream is heated, agglomerated and cooled to produce a cooled single phase water rich stream that is purified to produce a water product stream.

20 Claims, 4 Drawing Sheets

Related U.S. Application Data

(60) Provisional application No. 61/517,687, filed on Apr. 25, 2011, provisional application No. 61/572,394, filed on Jul. 15, 2011.

(51) Int. Cl.

| | | |
|---|---|---|
| *C02F 1/44* | (2006.01) | |
| *B01D 11/00* | (2006.01) | |
| *B01D 61/02* | (2006.01) | |
| *B01D 61/58* | (2006.01) | |
| *C02F 1/38* | (2006.01) | |
| *B01D 21/26* | (2006.01) | |
| *C02F 1/40* | (2006.01) | |
| *C02F 1/50* | (2006.01) | |
| *B01D 61/14* | (2006.01) | |
| *C02F 1/02* | (2006.01) | |
| *C02F 1/28* | (2006.01) | |
| *C02F 1/32* | (2006.01) | |
| *C02F 1/52* | (2006.01) | |
| *C02F 1/00* | (2006.01) | |
| *C02F 103/08* | (2006.01) | |
| *B01D 21/00* | (2006.01) | |
| *B01D 21/34* | (2006.01) | |

(52) U.S. Cl.
CPC ......... *B01D 61/002* (2013.01); *B01D 61/007* (2013.01); *B01D 61/025* (2013.01); *B01D 61/58* (2013.01); *C02F 1/325* (2013.01); *C02F 1/38* (2013.01); *C02F 1/40* (2013.01); *C02F 1/441* (2013.01); *C02F 1/50* (2013.01); *B01D 21/009* (2013.01); *B01D 21/34* (2013.01); *B01D 61/027* (2013.01); *B01D 61/145* (2013.01); *B01D 2311/103* (2013.01); *B01D 2311/106* (2013.01); *B01D 2311/14* (2013.01); *B01D 2311/2642* (2013.01); *C02F 1/02* (2013.01); *C02F 1/28* (2013.01); *C02F 1/32* (2013.01); *C02F 1/442* (2013.01); *C02F 1/444* (2013.01); *C02F 1/52* (2013.01); *C02F 2001/007* (2013.01); *C02F 2103/08* (2013.01); *C02F 2303/04* (2013.01); *C02F 2303/10* (2013.01); *C02F 2303/16* (2013.01); *Y02W 10/30* (2015.05); *Y02W 10/37* (2015.05)

(56) References Cited

U.S. PATENT DOCUMENTS

| | | | |
|---|---|---|---|
| 5,679,254 | A | 10/1997 | Chakrabarti |
| 6,180,001 | B1 | 1/2001 | King et al. |
| 6,393,295 | B1 | 5/2002 | Butler et al. |
| 7,560,029 | B2 | 7/2009 | McGinnis |
| 8,021,553 | B2 | 9/2011 | Iyer |
| 8,852,436 | B2 | 10/2014 | Rajagopalan et al. |
| 9,216,917 | B2 * | 12/2015 | Carmignani et al. B01D 61/002 |
| 2009/0261040 | A1 | 10/2009 | Pruet |
| 2010/0155329 | A1 | 6/2010 | Iyer |
| 2011/0017666 | A1 | 1/2011 | Cath et al. |
| 2011/0081469 | A1 | 4/2011 | Herron et al. |
| 2011/0272355 | A1 | 11/2011 | Rajagopalan et al. |
| 2012/0267308 | A1 | 10/2012 | Carmignani et al. |
| 2014/0238917 | A1 | 8/2014 | McGinnis |

FOREIGN PATENT DOCUMENTS

| | | |
|---|---|---|
| JP | 2001179237 A | 7/2001 |
| JP | 2002355683 A | 12/2002 |
| JP | 2011078879 A | 4/2011 |
| JP | 2011525147 A | 9/2011 |
| RU | 2412929 C2 | 2/2010 |
| WO | 2007147013 A1 | 12/2007 |
| WO | 2009015596 A | 12/2009 |
| WO | 2010/088170 A2 | 8/2010 |
| WO | 2010107804 A1 | 9/2010 |
| WO | 2012148864 A1 | 11/2012 |

OTHER PUBLICATIONS

U.S. Appl. No. 11/796,118, filed Apr. 26, 2007, entitled "Forward Osmosis Utilizing a Controllable Osmotic Agent," Inventor(s): Timothy Lewis Oriard and Peter Dale Haggerty both of Washington, pp. 1-26.

"Office Action dated Jan. 20, 2014," Canadian Application No. 2830390, 7 pages.

"International Search Report and Written Opinion dated Jul. 18, 2012," International Application No. PCT/US2012/034723, 16 pages.

"First Office Action dated Jul. 28, 2014," Chinese Application No. 201280017645.5, 33 pages.

Office Action mailed Nov. 20, 2014; in Canadian patent application No. 2,830,390.

English translation of the Examination Report mailed Jan. 19, 2015; in Australian patent application No. 2012249944.

Extended Search Report mailed Nov. 7, 2014; in European patent application No. 12776835.6.

Decision of Grant mailed Feb. 25, 2015; in Russian patent application 2013145560.

English translation of the Decision of Grant mailed Feb. 25, 2015; in Russian patent application 2013145560.

International Preliminary Report on Patentability mailed Oct. 29, 2013; in PCT patent application No. PCT/US2012/034723.

English abstract for RU2412929; published on Feb. 27, 2011 and retrieved Apr. 16, 2015.

Notification to Grant Patent Right for Invention mailed Sep. 15, 2015; in Chinese patent application No. 201280017645.

Search Report mailed Aug. 19, 2015; in Japanese patent application No. 2014508472.

Office Action mailed Sep. 29, 2015; in Japanese patent application No. 2014508472.

English abstract for JP2011525147(abstract of corresponding document: WO20091555896); published on Sep. 15, 2011 and retrieved Oct. 6, 2015.

English abstract for H08309351; published on Nov. 26, 1996 and retrieved Oct. 6, 2015.

English abstract for JP2011078879; published on Apr. 21, 2011 and retrieved Oct. 6, 2015.

English abstract for JP2002355683; published on Dec. 10, 2002 and retrieved Oct. 7, 2015.

English abstract for JP2001179237; published on Jul. 3, 2001 and retrieved Oct. 7, 2015.

Office Action mailed Oct. 21, 2015; in Canadian patent application No. 2,830,390.

\* cited by examiner

RECOVERY OF RETROGRADE SOLUBLE SOLUTE FOR FORWARD OSMOSIS WATER TREATMENT

CROSS REFERENCE TO RELATED APPLICATIONS

This application claims priority from U.S. provisional application No. 61/517,687, entitled "REGENERATION OF RETROGRADE SOLUBLE SOLUTES FOR FORWARD OSMOSIS WATER TREATMENT," filed on Apr. 25, 2011, U.S. provisional application No. 61/572,394, entitled "RETROGRADE SOLUBLE SOLUTE FOR FORWARD OSMOSIS WATER TREATMENT," filed on Jul. 15, 2011, and U.S. non-provisional application Ser. No. 13/454,062, entitled "RECOVERY OF RETROGRADE SOLUBLE SOLUTE FOR FORWARD OSMOSIS WATER TREATMENT," filed on Apr. 23, 2012, which are all incorporated by reference in their entirety, for all purposes, herein.

FIELD OF TECHNOLOGY

The present disclosure is directed to sea water, brackish water, waste water and/or contaminated water desalination. More specifically, the present disclosure is directed to forward osmosis desalination.

BACKGROUND

Forward osmosis is known in the art and has been the subject of recent study due to the likelihood of future fresh water shortages and a corresponding increase in demand for cost effective desalinization and water purification technologies. Sea water, brackish water or otherwise contaminated water can be purified by drawing the water (the solvent) through a semipermeable membrane, which rejects the salts and other contaminants (the solutes). This natural, or forward, osmosis approach differs from the widely used reverse osmosis process where the water is forced through a similarly acting semipermeable membrane under pressure. In forward osmosis processes, the water is drawn through the semipermeable membrane using a draw solution. The forward osmosis process does not purify the water. Forward osmosis simply moves the water from one set of solutes to another set of solutes.

A review and summary of forward osmosis technology is provided by Miller and Evens, Forward Osmosis: A new approach to water purification and desalination, Sandia Report SAND2006-4634, July 2006 in which the concept of using retrograde soluble polymer draw solutes is discussed. The process for accomplishing the separation of the solutes from the water is not described.

An ammonia-carbon dioxide based forward osmosis system is described in U.S. Pat. Nos. 7,560,029 and 6,393,295 to McGinnis where the temperature dependent solubility of the solutes is used for partial separation of the solutes from water. The precipitated solutes in disclosed are solid salts and the balance of the separation is achieved with distillation. U.S. patent application Ser. No. 11/632,994 by Collins also describes using the temperature dependent solubility of salts to separate draw solute from water.

U.S. patent application Ser. No. 11/796,118 describes another forward osmosis system that utilizes coated magnetic nanoparticles as a draw solute. PCT WO/2010/107804 describes using magnetic particles as a controllable osmotic agent.

U.S. Pat. No. 5,679,254 to Chakrabarti describes using the temperature dependent solubility of polymers in water to accomplish desalination, although not through forward osmosis.

U.S. Pat. No. 8,021,553 to Iyer describes a system using retrograde soluble polymer solutes and a nanofilter for separation and recovery of the resulting solute micelles from the product water. Iyer specifies draw solutes with both a hydrophobic and hydrophilic component. Iyer also discloses semi-batch recovery of the solutes by collecting the precipitated (or phase separated) draw solute on a nanofilter and recovering the solute by back flushing the nanofilter.

Improved systems and processes for forward osmosis water purification or desalination are herein disclosed.

SUMMARY

Improved systems and processes for forward osmosis water purification or desalination are herein disclosed. According to one embodiment a process for purifying contaminated water is provided. The process includes providing a contaminated feed solution stream comprising water and having a first osmotic pressure on a feed side of a semipermeable membrane and providing a draw solution stream comprising a draw solute and having a second osmotic pressure on a draw side of the semipermeable membrane. Water is passed through the semipermeable membrane to the draw side to produce a diluted draw solution stream. The draw solute in the diluted draw solution stream is permitted to produce a two phase effluent stream. The draw solute in the two phase effluent stream is agglomerated to produce an agglomerated effluent stream. The agglomerated draw solute is separated from the agglomerated effluent stream to produce a water rich stream comprising water and residual draw solute and a solute rich stream comprising agglomerated draw solute and water. The water rich stream is cooled to dissolve the residual draw solute and to produce a cooled single phase water rich stream. The residual draw solute is separated from the cooled single phase water rich stream to produce a residual draw solute stream and a purified water product stream.

In yet another aspect, the present disclosure provides a process for purifying contaminated water comprising: providing a contaminated feed solution stream comprising water and having a first osmotic pressure on a feed side of a semipermeable membrane; providing a draw solution stream comprising a draw solute and having a second osmotic pressure on a draw side of the semipermeable membrane; passing water through the semipermeable membrane to the draw side to produce a diluted draw solution stream; heating the diluted draw solution stream to initiate phase separation and produce a two phase effluent stream comprising a liquid phase of draw solute and a liquid phase of water; agglomerating the draw solute in the two phase effluent stream to produce an agglomerated two phase effluent stream comprising a liquid phase of agglomerated draw solute and a liquid phase of water; separating the agglomerated draw solute from the agglomerated two phase effluent stream to produce a water rich stream comprising water and residual draw solute and a solute rich stream comprising agglomerated draw solute and water. The process for purifying contaminated water can further comprise cooling the water rich stream to produce a cooled single phase water rich stream; and separating the residual draw solute from the cooled single phase water rich stream to produce a residual draw solute stream and a purified water product stream.

In yet another aspect, the present disclosure provides a system for purifying contaminated water comprising: a semipermeable membrane comprising a feed side for receiving a contaminated feed solution stream comprising water and having a first osmotic pressure and a draw side for receiving a draw solution stream comprising a draw solute and having a second osmotic pressure, wherein the semipermeable membrane is configured to pass water from the contaminated feed solution stream to the draw side to produce a diluted draw solution stream; a first heat exchanger configured for heating the diluted draw solution stream to initiate phase separation and produce a two phase effluent stream comprising a liquid phase of draw solute and a liquid phase of water; a coalescer configured for agglomerating the draw solute in the diluted draw solution stream to produce an agglomerated two phase effluent stream comprising a liquid phase of agglomerated draw solute and a liquid phase of water; and a liquid phase separator configured for separating the agglomerated draw solute from the agglomerated two phase effluent stream to produce a water rich stream comprising water and residual draw solute and a solute rich stream comprising agglomerated draw solute and water. The system for purifying contaminated water can further comprise a second heat exchanger configured for cooling the water rich stream to produce a cooled single phase water rich stream; and a nanofilter and/or a reverse osmosis module configured for separating the residual draw solute from the cooled single phase water rich stream to produce a residual draw solute stream and a purified water product stream.

The foregoing and other objects, features and advantages of the present disclosure will become more readily apparent from the following detailed description of exemplary embodiments as disclosed herein.

BRIEF DESCRIPTION OF THE DRAWINGS

Embodiments of the present application are described, by way of example only, with reference to the attached Figures, wherein.

DETAILED DESCRIPTION

Figure 1:
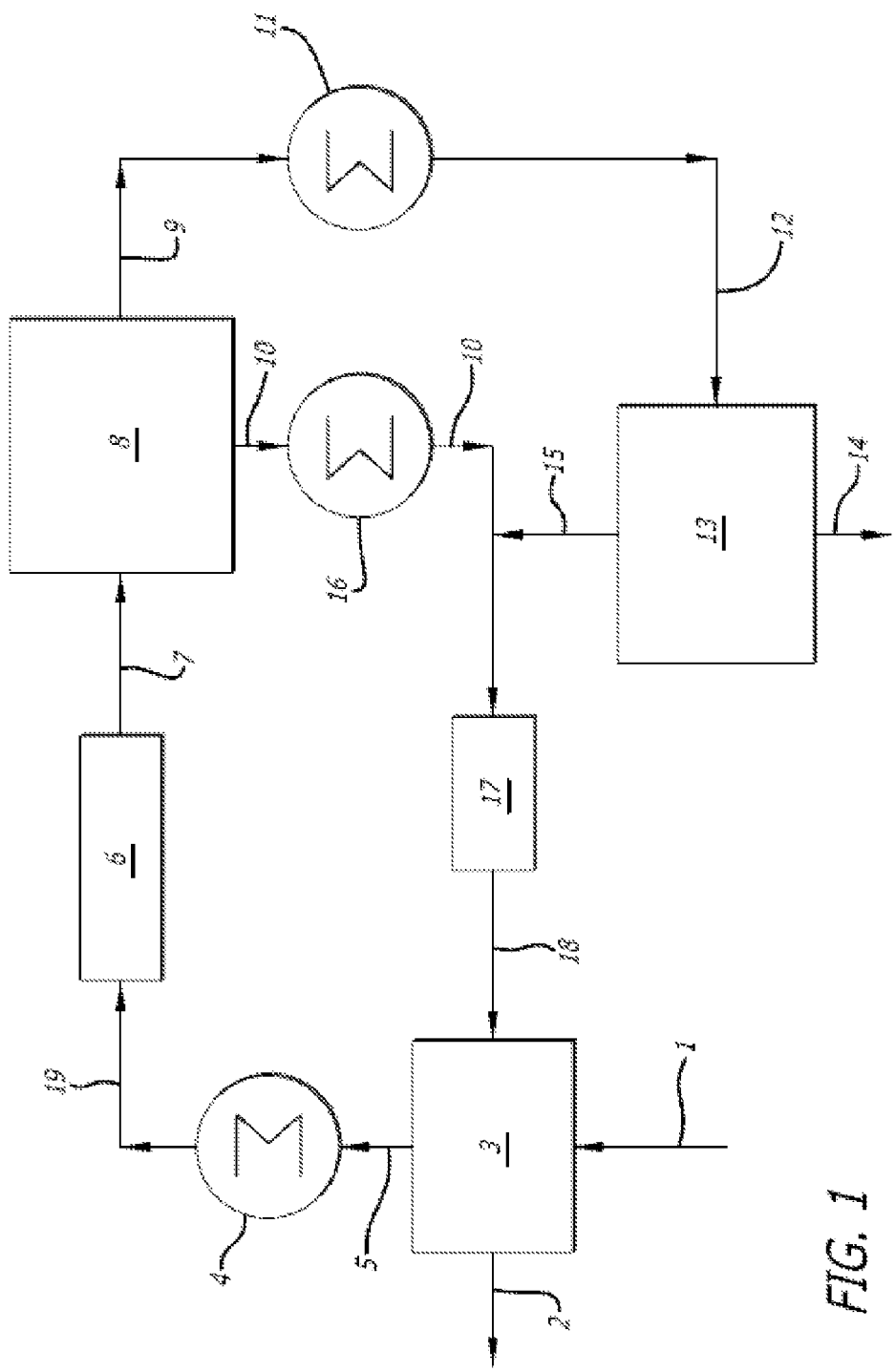
FIG. 1 illustrates an exemplary forward osmosis process according to one embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

The present disclosure is directed to improved draw solution systems and processes for forward osmosis water purification or desalination. The draw solution systems and processes include a device for separating draw solution solutes from a water solvent and concentrating draw solution solutes as part of a forward osmosis water purification system.

The draw solutes herein disclosed exhibit retrograde solubility. The solubility of the draw solutes herein disclosed decreases significantly with temperature but have sufficient solubility at ambient conditions to provide a useful working osmotic pressure. The draw solutes herein disclosed are preferably polymers specifically designed for use in a retrograde soluble forward osmosis water purification system and process.

In an exemplary embodiment the draw solute is a random or sequential copolymer of low molecular weight diols such as 1,2 propanediol, 1,3 propanediol and/or 1,2 ethanediol. The draw solutes have an acceptable osmotic pressure for the specific purification application of interest with a cloud point temperature of between 40° C. to 90° C. and a molecular weight high enough to allow polish filtering of the dissolved polymer using a nanofilter and/or reverse osmosis membrane.

In an exemplary embodiment, the draw solute is a polyglycol copolymer for use with a draw solute recovery process including a coalescer/separator for bulk solute recovery and a nanofilter for final recovery of the redissolved solute.

The draw solute copolymers herein disclosed consist of various numbers and orders of diols, which impart the required solution properties. Osmotic pressure, cloud point temperature, molecular weight and molecular structure are adjusted by adding or subtracting the various monomer units.

In an exemplary embodiment, 1,2 ethanediol units are added to the draw solute copolymer to increase molecular weight and the cloud point temperature of the resulting draw solute polymer. Conversely, the addition of 1,2 propanediol units to the draw solute polymer results in a lower cloud point temperature and a higher molecular weight of the resulting draw solute polymer.

In another exemplary embodiment, 1,3 propanediol or 1,2 ethanediol monomers are substituted for a portion of 1,2 propanediols monomers of higher molecular weight poly(propylene) glycol polymers to increase the solubility and decrease the cloud point temperature of the resulting polymer.

The osmotic pressure of the exemplary draw solutes depends on the application and the desired recovery. The exemplary draw solutes require higher osmotic pressure for high recovery in applications with process streams containing higher concentrations of dissolved solids. The draw solution osmotic pressure required for the exemplary systems and processes for forward osmosis water desalination of seawater is generally greater than ~30 atm at minimum with greater than ~40 atm being preferred to allow for reasonable product flux and recovery. In an exemplary embodiment, the solubility of the draw solute decrease at a temperature sufficiently (~10° C.) above ambient temperature and sufficiently (~10° C.) below the bubble point temperature. In other words, the draw solute solubility changes significantly and solubility dependence on temperature increases between temperatures of 40° C. to 90° C. Exemplary draw solutes having a strong solubility dependence at the lower temperature range (e.g., closer to 40° C.) are preferred to minimize the operating temperature of the regeneration steps in the process and to minimize resulting energy loss.

Within the constraints of osmotic pressure and cloud point temperature, the chemistry of the exemplary draw solute polymers is selected such to control the molecular weight and/or physical structure of the polymer resulting in high (>90% and preferably >99%) rejection of the draw solute through filtration. Further, the chemistry of the exemplary draw solute polymers is selected to minimize back diffusion of the solute through a forward osmosis membrane. Preferably, for salt water desalination, the osmotic pressure of an exemplary draw solution containing 40% draw solute copolymer in water is greater than 30 atm, preferably greater than 40 atm and more preferably greater than 50 atm, while the molecular weight of the draw solute copolymer is greater than 500, preferably greater than 1000 and more preferably greater than 2000.

Example Draw Solute Compositions

The following non-limiting examples are provided to illustrate exemplary embodiments and are not intended to limit the scope of this disclosure.

Draw solute polymer compositions including a polyoxy random copolymer were formulated at concentrations from 30-70% draw by weight solute in solution. The effect of draw solution concentration on osmotic pressure at a typical forward osmosis operating temperature 25° C. is shown in Table 1. Osmotic pressure was measured directly against a NaCl reference standard using equilibrium dialysis

TABLE 1

Draw Solute Concentration vs. Osmotic Pressure

| Draw Solute Concentration (%) | Osmotic Pressure (atm) |
| --- | --- |
| 30 | 40 |
| 40 | 45 |
| 50 | 60 |
| 70 | 95 |

FIG. 1 illustrates an exemplary forward osmosis process according to one embodiment. A brackish water source stream 1 is fed to a feed side of a semipermeable membrane in a forward osmosis module 3. A draw solution stream 18 is fed to a draw side of a semipermeable membrane in the forward osmosis module 3. The osmotic pressure of brackish water source stream 1 is less than the osmotic pressure of the draw solution stream 18. This pressure differential drives water from the brackish water source stream 1 to permeate through the semipermeable membrane resulting in a dilute draw solution stream 5 and a brine stream 2.

The dilute draw solution stream 5 is passed through a heat exchanger network 4 where the temperature is increased sufficiently to initiate phase separation. The heat exchanger network 4 can include one or more heat exchangers configured in series or parallel for increasing the temperature of the dilute draw solution 5. The temperature of the dilute draw solution stream 19 exiting as effluent from the heat exchanger network 4 is sufficient to create a two phase effluent.

The two phase draw solution effluent stream 19 exiting the heat exchanger network 4 is fed to a temperature controlled coalescer 6 to agglomerate small solute rich droplets in the heat exchanger network 4. The coalescer 6 is designed to aggregate solute rich drops large enough to be separated in the subsequent phase separator process 8. In an exemplary embodiment, the coalescer 6 is designed to aggregate solute rich drops to greater than 10 µm, preferably greater than 25 µm and more preferably greater than 50 µm. The pressure drop caused by two phase flow streams passed through the coalescer 6 is significantly less than pressure drop caused by two phase flow streams passed through a nanofilter. The use of the coalescer 6 eliminates added complexity and back-flushing required in semi-batch operations.

The coalescer 6 can also be segregated into a top section comprising hydrophobic coalescing elements for agglomerating the draw solute and a bottom section comprising hydrophilic coalescing elements for water aggregation. The degree of hydrophobicity of the hydrophobic coalescing elements and the degree of hydrophilicity of the hydrophilic coalescing elements are selected to achieve a specific degree of agglomeration of the draw solute to greater than 10 µm. In an exemplary embodiment, the degree of hydrophobicity of the hydrophobic coalescing elements and the degree of hydrophilicity of the hydrophilic coalescing elements are selected to agglomerate the draw solute to greater than 10 µm.

The coalescer effluent stream 7 is fed to a liquid phase separator 8 wherein the solute rich drops from the coalescer 6 are accumulated. The liquid phase separator 8 is designed to separate two or more immiscible liquids or solutions. More particularly, the liquid phase separator 8 is designed to separate solute from water and produce a continuous solute rich stream 10 and a continuous water rich stream 9. The liquid phase separator 8 can be a temperature controlled gravity phase separator, centrifuge, hydro-cyclone or similar device. In at one embodiment of the present disclosure, the liquid phase separator 8 is a temperature controlled gravity phase separator. In an exemplary embodiment, the operating temperature of the coalescer 6 and liquid phase separator 8 is maintained at less than 150° C., preferably less than 100° C. and more preferably less than 80° C. to establish a specific concentration of the solute and osmotic pressure of the water rich stream 9 exiting as effluent from the liquid phase separator 8. In an exemplary embodiment, the operating temperature of the coalescer 6 and liquid phase separator 8 is selected to establish a concentration of solute in the water rich stream 9 of less than 5%, preferably less than 2% and more preferably less than 1% by weight solute in solution.

In an exemplary embodiment, the liquid phase separator 8 is designed to concentrate the solute in the solute rich stream 10 to a concentration of greater than 60%, preferably greater than 80% and more preferably greater than 90% by weight solute in solution. The solute rich stream 10 exiting the liquid phase separator 8 as effluent is cooled in a heat exchanger 16. The water rich stream 9 exiting as effluent from the phase separator 8 is also cooled by a heat exchanger 11 to allow residual solute to redissolve and to create a single phase cooled water rich stream 12. The cooled water rich stream 12 is a single phase stream fed to a nanofilter 13, ultrafilter, or reverse osmosis module including a semipermeable membrane or similar device used to separate the residual solute from the product water. The nanofilter 13 is selected to reject the solute molecules based on size or structure and ideally passes most of the dissolved salt. The final filtration step in the nanofilter 13, ultrafilter, reverse osmosis module or similar device is used only for the recovery of the residual solutes in the single phase cooled water rich stream 12. The solutes are redissolved in single phase cooled water rich stream 12 to minimize pressure drop across the nanofilter 13 and to simplify operation. A solute free water filter permeate 14 is the process product.

The solute rich stream 15 exiting the nanofilter 13 is combined in a mixer 17 with the cooled solute rich stream 10 exiting the heat exchanger 16 to create a combined solute rich stream 18 (that is, the draw solution stream 18, above). The mixer 17 is used to completely dissolve the solute in the resulting combined solute rich stream 18. The combined solute rich stream 18 is fed to the forward osmosis module 3 to purify or desalinate the source stream 1 in a continuous manner. The solute rich stream 10 exiting the phase separator 8 as effluent is cooled in the heat exchanger 16 to a specific temperature that maintains the temperature of combined solute rich stream 18 sufficiently low and provides complete solubility of the solute in the combined solute rich stream 18 entering the forward osmosis module 3.

In an exemplary embodiment of FIG. 1, the coalescer 6 and/or the phase separator 8 can be heated to operating temperature with an additional external heat source (not shown).

In another exemplary embodiment of FIG. 1, the coalescer 6 and phase separator 8 are combined into one physical device. Alternatively, the surface area within the heat exchanger network 4 and the piping between the heat exchanger network 4 and the phase separator 8 can be used in place of the coalescer 6.

In another exemplary embodiment of FIG. 1, instead of maintaining temperature based on solute concentration, the temperature of the coalescer 6 and phase separator 8 is controlled to maintain the osmotic pressure of the water rich stream 9 at less than 50 mOsm, preferably less than 25 mOsm and more preferably less than 15 mOsm.

In another exemplary embodiment of FIG. 1, the concentration of solute in the dilute draw solution stream 5 is controlled using the flow rate of the dilute draw solution stream 5 or the combined solute rich stream 18. The target concentration in the dilute draw solution 5 is controlled to maintain a minimum flux in the forward osmosis module 3 of at least 4 L/(m$^2$*hr).

In another exemplary embodiment of FIG. 1, the microorganism concentration in the dilute draw solution stream 5 is controlled with a UV sterilizer or the addition of a biocide.

In another exemplary embodiment of FIG. 1, an advanced oxidation process or adsorption system is used to remove residual draw solute from the filter permeate 14.

In another exemplary embodiment of FIG. 1, the nanofilter 13, ultrafilter or reverse osmosis filter is selected to obtain a molecular weight cutoff less than 2000, preferably less than 1000 and more preferably less than 500; a NaCl rejection less than 50%, preferably less than 25% and more preferably less than 10%; and a solute rejection greater than 95%, preferably greater than 99% and more preferably greater than 99.9% by weight solute in solution.

Example Coalescer Operating Conditions

The effect of coalescer operating temperature on process stream concentration and osmotic pressure in the forward osmosis process illustrated in FIG. 1 was investigated. A preferred draw solution comprising a polyoxy random copolymer was used in the process. Upon heating in the coalescer 6, the osmotic pressure of the dilute draw solution stream 5 decreased and the solution separated into a solute rich phase and a water rich phase. The coalescer effluent 7 was fed to a temperature controlled liquid phase separator 8, wherein the liquid phase separator 8 separated solute from water to produce a continuous solute rich stream 10 and a continuous water rich stream 9. The osmotic pressure of the water rich stream 9 (which sets or constrains the final filter 13 power consumption) and the solute composition of the solute rich stream 10 (which sets or constrains the membrane flux and maximum brine concentration processed in the forward osmosis module) were measured as a function of coalescer operating temperature. The results are outlined in Table 2.

TABLE 2

Effects of Coalescer Operating Temperature

| Coalescer Operating Temperature (° C.) | Water-Rich Coalescer Effluent Osmotic Pressure (mOsm) | Solute-Rich Coalescer Effluent Concentration (wt %) |
| --- | --- | --- |
| 75 | 27 | 50 |
| 80 | 22 | 55 |
| 85 | 20 | 63 |
| 90 | 17 | 72 |
| 95 | 13 | 80 |

The operating temperature of the coalescer 6 was controlled to establish a specific osmotic pressure in the water rich stream 9 exiting as effluent from the separator 8. The operating temperature of the coalescer 6 was also controlled to establish a concentration of solute in the solute rich stream 10. As outlined in Table 2, increasing the operating temperature of the coalescer 6 decreases the osmotic pressure of the water rich stream 9, thereby reducing the power required for filtration in the final filtration step 13. Increasing the operating temperature of the coalescer 6 also results in an increase in concentration of solute in the solute rich coalescer effluent, thereby allowing an increase in the membrane flux and maximum brine concentration processed in the forward osmosis module 3.

Figure 2:
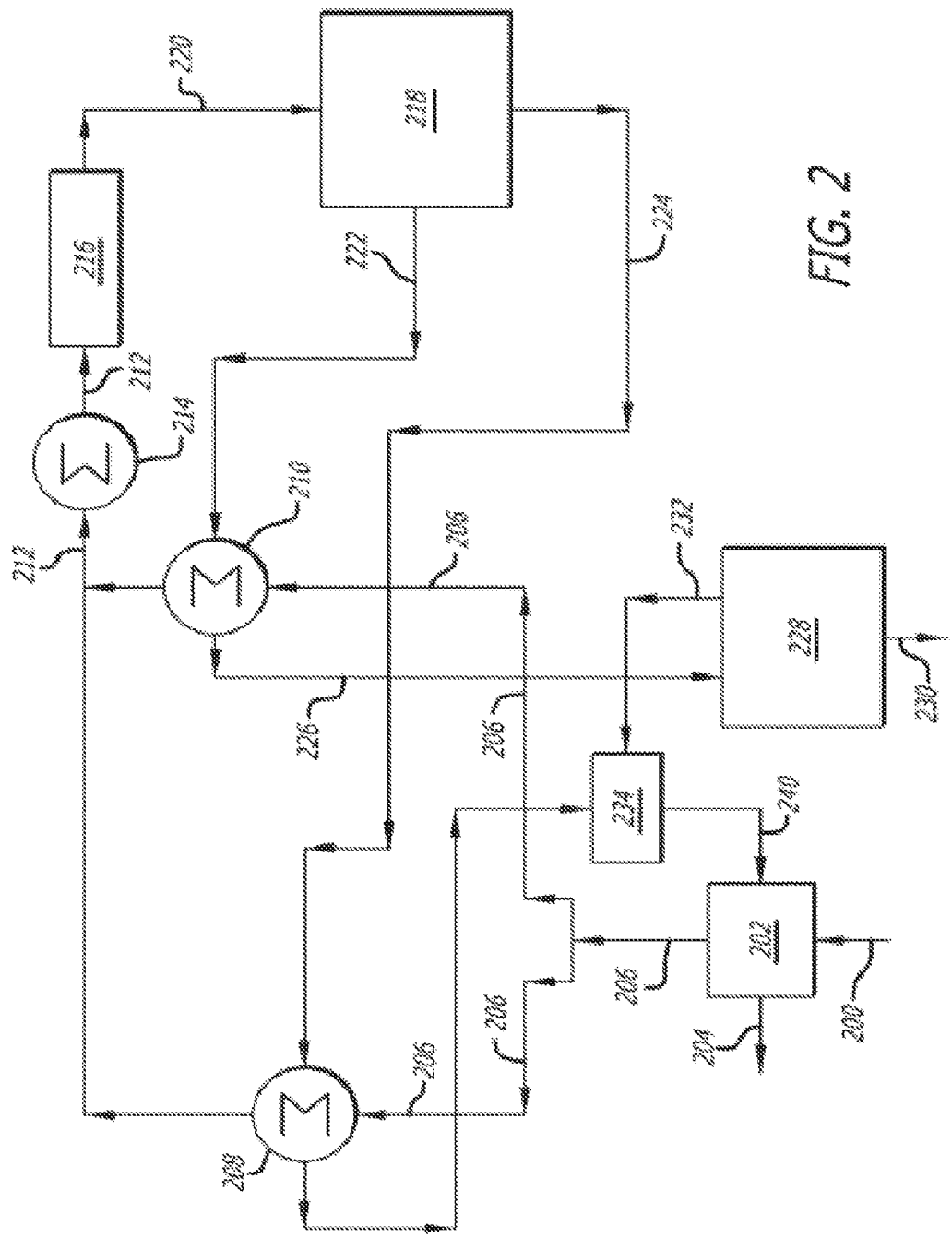
FIG. 2 illustrates an exemplary forward osmosis process according to another embodiment.

FIG. 2 illustrates an exemplary forward osmosis process according to another embodiment. A sea water source stream 200 is fed to a feed side of a semipermeable membrane in a forward osmosis module 202. A draw solution stream 240 is fed to a draw side of a semipermeable membrane in the forward osmosis module 202. The osmotic pressure of the sea water source stream 200 is less than the osmotic pressure of the draw solution stream 240. This pressure differential drives water from the sea water source stream 200 to permeate through the semipermeable membrane resulting in a dilute draw solution stream 206 and a brine stream 204.

The dilute draw solution stream 206 can be split into two dilute draw solution streams 206 and fed to a heat exchanger network comprising two or more heat exchangers 208, 210, 214. One dilute draw solution stream 206 is fed to a solute rich heat exchanger 208 and the other dilute draw solution stream 206 is fed to a water rich heat exchanger 210. Both dilute draw solution streams 206 are heated in respective heat exchangers 208, 210 and the resulting heated draw solution streams are recombined to form a combined dilute draw solution stream 212. The flow rate ratio of the dilute draw solution streams 206 is adjusted so that the temperature difference between the two dilute draw solution streams 206 exiting the heat exchangers 208, 210 in the heat exchanger network is less than 5° C., preferably less than 3° C. and more preferable less than 1° C. The combined dilute draw solution stream 212 can be passed through an additional makeup heat exchanger 214 wherein external heat from a waste heat source, a solar thermal source, or a fuel fired heat source (not shown) is added to adjust the temperature and account for process heat losses.

The dilute draw solution streams 206 and combined draw solution stream 212 are heated in the heat exchanger network 208, 210, 214 sufficiently to initiate phase separation. The temperature of the combined dilute draw solution stream 212 exiting as effluent from the makeup heat exchanger 214 is sufficient to create a two phase effluent 212.

The two phase draw solution effluent stream 212 exiting the makeup heat exchanger 214 is fed to a temperature controlled coalescer 216 to agglomerate small solute rich droplets in the heat exchanger network 208, 210, 214. The coalescer 216 is designed to aggregate solute rich drops large enough to be separated in the subsequent phase separator process 218. In an exemplary embodiment, the coalescer 216 is designed to aggregate solute rich drops to greater than 10 µm, preferably greater than 25 µm and more preferably greater than 50 µm. The pressure drop caused by two phase flow streams passed through the coalescer 216 is significantly less than pressure drop caused by two phase flow streams passed through a nanofilter. The use of the coalescer 216 eliminates added complexity and back-flushing required in semi-batch operations.

The coalescer 216 can also be segregated into a top section comprising hydrophobic coalescing elements for agglomerating the draw solute and a bottom section comprising hydrophilic coalescing elements for water aggregation. The degree of hydrophobicity of the hydrophobic coalescing elements and the degree of hydrophilicity of the hydrophilic coalescing elements are selected to achieve a specific degree of agglomeration of the draw solute to greater than 10 µm. In an exemplary embodiment, the degree of hydrophobicity of the hydrophobic coalescing elements and the degree of hydrophilicity of the hydrophilic coalescing elements are selected to agglomerate the draw solute to greater than 10 µm.

The coalescer effluent stream 220 is fed to a liquid phase separator 218, wherein the solute rich drops from the coalescer 216 are accumulated. The liquid phase separator 218 is designed to separate two or more immiscible liquids or solutions. More particularly, the liquid phase separator 218 is designed to separate solute from water and produce a continuous water rich stream 222 and a continuous solute rich stream 224. The liquid phase separator 218 can be a temperature controlled gravity phase separator, centrifuge, hydro-cyclone or similar device. In at one embodiment of the present disclosure, the liquid phase separator 8 is a temperature controlled gravity phase separator. In an exemplary embodiment, the operating temperature of the coalescer 216 and liquid phase separator 218 is maintained at less than 150° C., preferably less than 100° C. and more preferably less than 80° C. to establish a specific concentration of the solute and osmotic pressure of the water rich stream 222 exiting as effluent from the liquid phase separator 218. In an exemplary embodiment, the operating temperature of the coalescer 216 and liquid phase separator 218 is selected to establish a concentration of solute in the water rich stream 222 of less than 5%, preferably less than 2% and more preferably less than 1% by weight solute in solution. In an exemplary embodiment, the gravity phase separator 218 is designed to concentrate the solute in the solute rich stream 224 to a concentration of greater than 60%, preferably greater than 80% and more preferably greater than 90% by weight solute in solution.

The water rich stream 222 exiting as effluent from the liquid phase separator 218 is passed through the water rich heat exchanger 210 where it is cooled by the dilute draw solution stream 206 and the dilute draw solution stream 206 is in turn heated by the water rich stream 222. The solute rich stream 224 exiting as effluent from the liquid phase separator 218 is passed through the solute rich heat exchanger 208 where is cooled by the dilute draw solution stream 206 and the dilute draw solution stream 206 is in turn heated by the solute rich stream 224. Therefore, the heat exchanger network 208, 210, 214 primarily scavenges/recovers sensible heat from the gravity phase separator 218 effluents including the continuous water rich stream 222 and the continuous solute rich stream 224. The water rich stream 222 and the solute rich stream 224 are cooled to within a few degrees of the forward osmosis module 202 operating temperature, while the dilute draw solution streams 206 are correspondingly heated.

The water rich stream 222 exiting as effluent from the liquid phase separator 218 is cooled by water rich heat exchanger 210 to allow residual solute to redissolve and to create a single phase cooled water rich stream 226. The cooled water rich stream 226 is a single phase stream fed to a nanofilter 228, ultrafilter, or reverse osmosis module including a semipermeable membrane or similar device used to separate the residual solute from the product water. The nanofilter 228 is selected to reject the solute molecules based on size or structure and ideally passes most of the dissolved salt. The final filtration step in the nanofilter 228, ultrafilter, reverse osmosis module or similar device is used only for the recovery of the residual solutes in single phase cooled water rich stream 226. The solutes are redissolved in single phase cooled water rich stream 226 to minimize pressure drop across the nanofilter 228 and to simplify operation. A solute free water filter permeate 230 is the process product.

The solute rich stream 232 exiting the nanofilter 228 is combined in a mixer 234 with the cooled solute rich stream 224 exiting the solute rich heat exchanger 208 to create a combined solute rich stream 240. The mixer 234 is used to completely dissolve the solute in the resulting combined solute rich stream 240. The combined solute rich stream 240 is fed to the forward osmosis module 202 to purify or desalinate the source stream 200 in a continuous manner. The solute rich stream 224 exiting the liquid phase separator 218 as effluent is cooled in the solute rich heat exchanger 208 to a specific temperature that maintains the temperature of combined solute rich stream 240 sufficiently low and provides complete solubility of the solute in the combined solute rich stream 240 entering the forward osmosis module 202.

In an exemplary embodiment of FIG. 2, the coalescer 216 and/or the liquid phase separator 218 can be heated to operating temperature with an additional external heat source (not shown).

In another exemplary embodiment of FIG. 2, the coalescer 216 and liquid phase separator 218 are combined into one physical device.

In another exemplary embodiment of FIG. 2, instead of maintaining temperature based on solute concentration, the temperature of the coalescer 216 and liquid phase separator 218 is controlled to maintain the osmotic pressure of the water rich stream 222 at less than 50 mOsm, preferably less than 25 mOsm and more preferably less than 15 mOsm.

In another exemplary embodiment of FIG. 2, the concentration of solute in the dilute draw solution streams 206 is controlled using the flow rate of the dilute draw solution stream 216 or the combined solute rich stream 240. The target concentration in the dilute draw solution streams 206 is controlled to maintain a minimum flux in the forward osmosis module 202 of at least 4 $L/(m^2 \cdot hr)$.

In another exemplary embodiment of FIG. 2, the microorganism concentration in the dilute draw solution streams 206 is controlled with a UV sterilizer or the addition of a biocide.

In another exemplary embodiment of FIG. 2, an advanced oxidation process or adsorption system is used to remove residual draw solute from the filter permeate 228.

In another exemplary embodiment of FIG. 2, the nanofilter 228, ultrafilter or reverse osmosis filter is selected to obtain a molecular weight cutoff less than 2000, preferably less than 1000 and more preferably less than 500; a NaCl rejection less than 50%, preferably less than 25% and more preferably less than 10%; and a solute rejection greater than 95%, preferably greater than 99% and more preferably greater than 99.9% by weight solute in solution.

Figure 3:
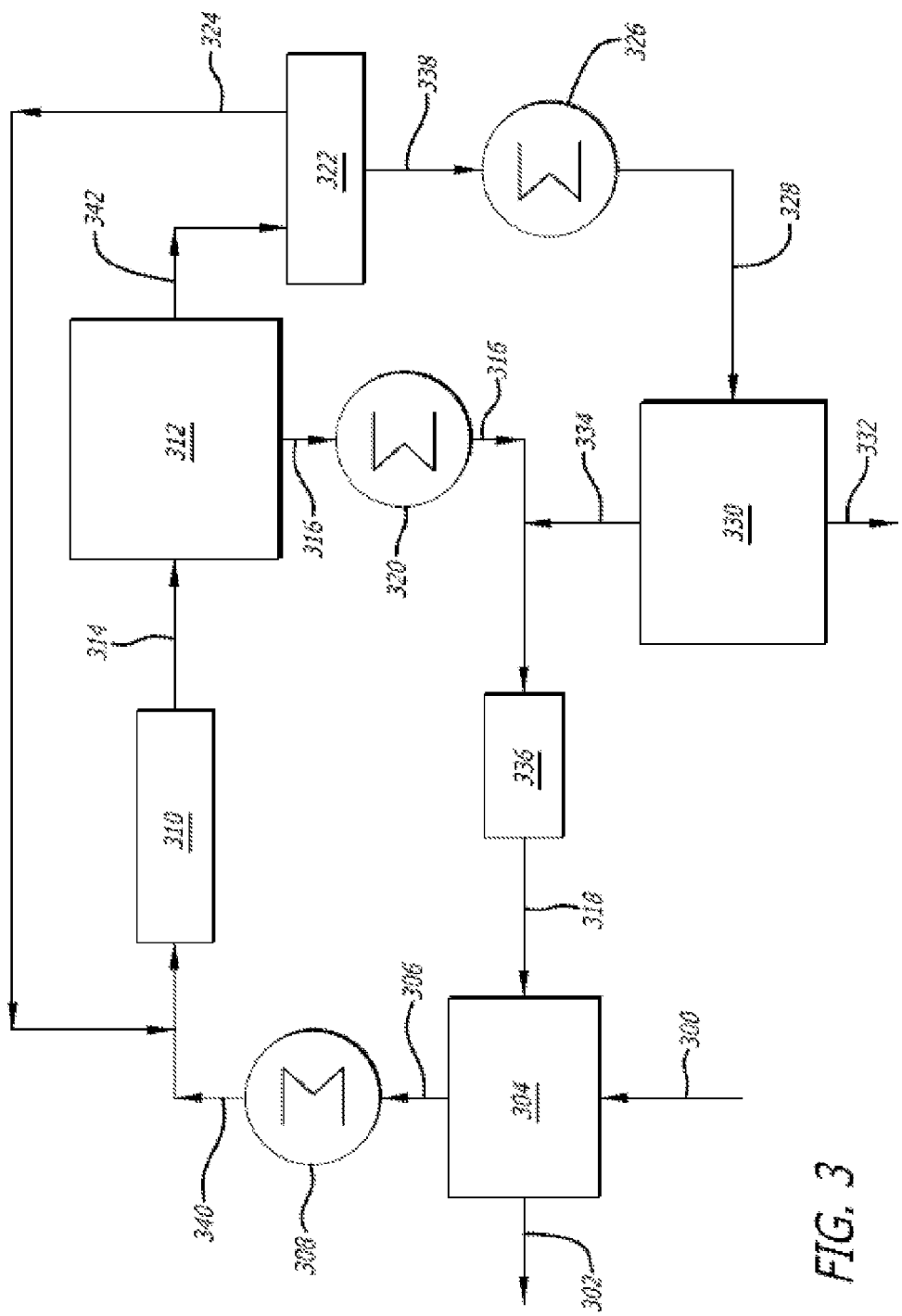
FIG. 3 illustrates an exemplary forward osmosis process according to another embodiment.

FIG. 3 illustrates an exemplary forward osmosis process according to another embodiment. A brackish water source stream 300 is fed to a feed side of a semipermeable membrane in a forward osmosis module 304. A draw solution stream 318 is fed to a draw side of a semipermeable membrane in the forward osmosis module 304. The osmotic pressure of brackish water source stream 300 is less than the osmotic pressure of the draw solution stream 318. This pressure differential drives water from the brackish water source stream 300 to permeate through the semipermeable membrane resulting in a dilute draw solution stream 306 and a brine stream 302.

The dilute draw solution stream 306 is passed through a heat exchanger network 308 where the temperature is increased sufficiently to initiate phase separation. The heat exchanger network 308 can include one or more heat exchangers configured in series or parallel for increasing the temperature of the dilute draw solution stream 306. The temperature of the dilute draw solution stream 340 exiting as effluent from the heat exchanger network 308 is sufficient to create a two phase effluent.

The two phase draw solution effluent stream 340 exiting the heat exchanger network 308 is fed to a primary temperature controlled coalescer 310 to agglomerate small solute rich droplets in the heat exchanger network 308. The primary coalescer 310 is designed to aggregate solute rich drops large enough to be separated in the subsequent phase separator process. In an exemplary embodiment, the primary coalescer 310 is designed to aggregate solute rich drops to greater than 10 µm, preferably greater than 25 µm and more preferably greater than 50 µm. The pressure drop caused by two phase flow streams passed through the primary coalescer 310 is significantly less than pressure drop caused by two phase flow streams passed through a nanofilter. The use of the coalescer 310 eliminates added complexity and back-flushing required in semi-batch operations.

The primary coalescer effluent stream 314 is fed to a liquid phase separator 312 wherein the solute rich drops from the coalescer 310 are accumulated. The liquid phase separator 312 is designed to separate two or more immiscible liquids or solutions. More particularly, the liquid phase separator 312 is designed to separate solute from water and produce a continuous solute rich stream 316 and a continuous water rich stream 342. The liquid phase separator 312 can be a temperature controlled gravity phase separator, centrifuge, hydro-cyclone or similar device. In at one embodiment of the present disclosure, the liquid phase separator 312 is a temperature controlled gravity phase separator. In an exemplary embodiment, the operating temperature of the primary coalescer 310 and liquid phase separator 312 can be maintained at less than 150° C., preferably less than 100° C. and more preferably less than 80° C. to establish a specific concentration of the solute in the water rich stream 342 exiting as effluent from the liquid phase separator 312. The operating temperature of the primary coalescer 310 and liquid phase separator 312 can also be maintained to establish a concentration of solute in the water rich stream 342 of less than 5%, preferably less than 2% and more preferably less than 1% by weight solute in solution. In an exemplary embodiment, the liquid phase separator 312 can be designed and operated to concentrate the solute in the solute rich stream 316 to a concentration of greater than 60%, preferably greater than 80% and more preferably greater than 90% by weight solute in solution. The solute rich stream 316 exiting the liquid phase separator 312 as effluent is cooled in a heat exchanger 320.

The water rich stream 342 exiting as effluent from the liquid phase separator 312 can be passed through a secondary temperature controlled coalescer 322 designed for a low concentration solute dispersed phase. The secondary coalescer 322 is designed to aggregate solute rich drops in the water rich stream 342 and produces a solute rich stream 324 exiting as effluent from the secondary coalescer 322. Due to coalescer flooding caused by high concentrations of solute, the use of a dense coalescing matrix is not viable within or before the primary coalescer 310. As a result, small droplets of solute rich phase may persist dispersed in the primary coalescer effluent stream 314. These small dispersed solute rich droplets will increase the osmotic pressure of the coalescer effluent 314 and correspondingly require a high pressure and power consumption for the final filter 330 step. The water rich stream 342 feeding the secondary coalescer 322 will have a low solute concentration allowing for the use of a denser coalescer matrix with smaller elements in the secondary coalescer 322 resulting in the smaller droplets to be aggregated and separated from the water rich stream 342 before it is sent to the final filter 330 step. The coalescer matrix design, material and configuration are selected based on the chemical properties of the solute, the concentration of the solute and the size of the dispersed drops.

The solute rich stream 324 exiting as effluent from the secondary coalescer 322 is recycled and added to the two phase draw solution effluent stream 340 exiting the heat exchanger network 308 upstream of the primary coalescer 310. The water rich stream 338 exiting as effluent from the secondary coalescer 322 is cooled by a heat exchanger 326 to allow residual solute to redissolve and to produce a single phase cooled water rich stream 328. The temperature of the secondary coalescer 322 is controlled independently as required to establish the concentration of the solute in the single phase cooled water rich stream 328 at less than 5%, preferably less than 2% and more preferably less than 1% by weight solute in solution.

The single phase cooled water rich stream 328 is fed to a nanofilter 330, ultrafilter, or reverse osmosis module including a semipermeable membrane or similar device to separate the residual solute from the product water. The nanofilter 330 is selected to reject the solute molecules based on size or structure and ideally passes most of the dissolved salt. The final filtration step in the nanofilter 330, ultrafilter, reverse osmosis module or similar device is used only for the recovery of the residual solutes in single phase cooled water rich stream 328. The solutes are redissolved in single phase cooled water rich stream 328 to minimize pressure drop across the nanofilter 330 and to simplify operation. A solute free water filter permeate 332 is the process product.

The solute rich stream 334 exiting the nanofilter 330 is combined in a mixer 336 with the cooled solute rich stream 316 to create a combined solute rich stream 318. The mixer 336 is used to completely dissolve the solute in the resulting combined solute rich stream 318. The combined solute rich stream 318 is fed to the forward osmosis module 304 to purify or desalinate the source stream 300 in a continuous manner. The solute rich stream 316 exiting the phase separator 312 as effluent is cooled in the heat exchanger 320 to a specific temperature that maintains the temperature of combined solute rich stream 318 sufficiently low to provide complete solubility of the solute in the water entering the forward osmosis module 304.

In an exemplary embodiment of FIG. 3, the coalescers 310, 322 and/or the liquid phase separator 312 can be heated to operating temperature with an additional external heat source (not shown).

In another exemplary embodiment of FIG. 3, the primary coalescer 310 and liquid phase separator 312 are combined into one physical device. Alternatively, the surface area within the heat exchanger network 308 and the piping between the heat exchanger network 308 and the phase separator 312 can be used to replace the primary coalescer 310 and its operation.

In another exemplary embodiment of FIG. 3, instead of maintaining temperature based on solute concentration, the temperature of the primary coalescer 310, secondary coalescer 322 and phase separator 312 is controlled to maintain the osmotic pressure of the water rich stream 338 at less than 50 mOsm, preferably less than 25 mOsm and more preferably less than 15 mOsm.

In another exemplary embodiment of FIG. 3, the concentration of solute in the dilute draw solution stream 306 is adjusted by controlling the flow rate of the dilute draw solution stream 306 or the combined solute rich stream 318. The target concentration in the dilute draw solution stream 306 is adjusted to maintain a minimum flux in the forward osmosis module 304 of at least 4 $L/(m^2 \cdot hr)$.

In another exemplary embodiment of FIG. 3, the microorganism concentration in the dilute draw solution stream 306 is controlled with a UV sterilizer or the addition of a biocide.

In another exemplary embodiment of FIG. 3, an advanced oxidation process or adsorption system is used to remove residual draw solute from the filter permeate 332.

In another exemplary embodiment of FIG. 3, the nanofilter 330, ultrafilter or reverse osmosis filter is selected to obtain a molecular weight cutoff less than 2000, preferably less than 1000 and more preferably less than 500; a NaCl rejection less than 50%, preferably less than 25% and more preferably less than 10%; and a solute rejection greater than 95%, preferably greater than 99% and more preferably greater than 99.9% by weight solute in solution.

The systems and processes for forward osmosis water purification or desalination herein disclosed initiate phase separation by heating, the resulting dispersed two phase system is aggregated using a coalescer and the bulk of the solute is recovered using a phase separator. Finally, the resulting water rich stream is cooled to dissolve any remaining dispersed solute and a single phase stream, of low solute concentration, is sent to a filter (e.g., nanofilter) for final, continuous, filtration processing. The nanofilter or similar device is not used to separate a two phase system in the final filtration step.

Figure 4:
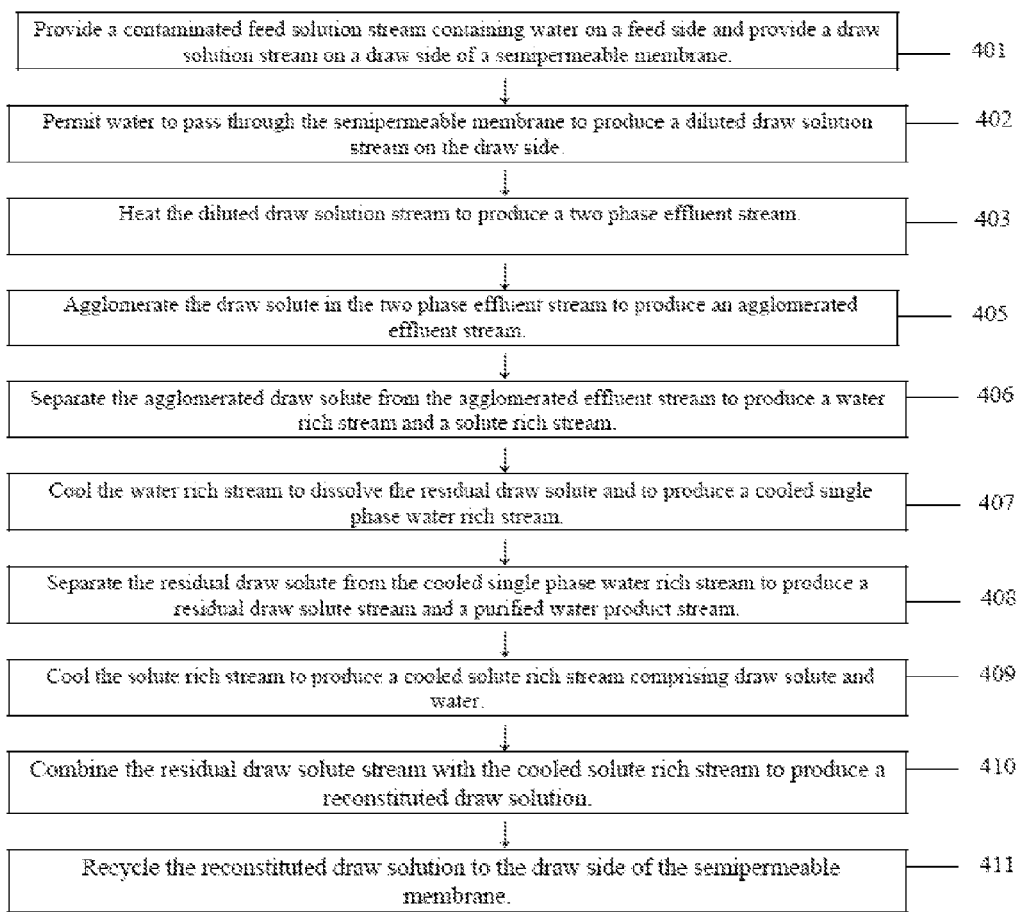
FIG. 4 illustrates an exemplary process flow diagram of an exemplary forward osmosis system according to one embodiment.

FIG. 4 illustrates an exemplary process flow diagram of an exemplary forward osmosis system according to one embodiment. At step 401, a contaminated feed solution stream comprising water and having a first osmotic pressure is provided on a feed side of the semipermeable membrane and a draw solution stream comprising a draw solute and having a second osmotic pressure is provided on a draw side of the semipermeable membrane. At step 402, water from the contaminated feed solution is permitted to pass through the semipermeable membrane to the draw side to produce a diluted draw solution stream comprising water and the draw solute on the draw side of the semipermeable membrane.

At step 403, the diluted dilute draw solution stream is heated sufficiently to produce a two phase effluent stream.

At step 405, the draw solute in the two phase effluent stream is agglomerated to produce an agglomerated effluent stream. At step 406, the agglomerated draw solute is separated from the agglomerated effluent stream to produce a water rich stream comprising water and residual draw solute and a solute rich stream comprising agglomerated draw solute and water.

At step 407, the water rich stream is cooled to dissolve the residual draw solute and to produce a cooled single phase water rich stream. At step 408, the residual draw solute is separated from the cooled single phase water rich stream to produce a residual draw solute stream and a purified water product stream.

The process can further include steps to reconstitute and recycle the draw solution. At step 409, the solute rich stream is cooled to produce a cooled solute rich stream comprising draw solute and water. At step 410, the residual draw solute stream is combined with the cooled solute rich stream to produce a reconstituted draw solution. At step 411, the reconstituted draw solution is recycled to the draw side of the semipermeable membrane.

Example embodiments have been described hereinabove regarding improved systems and processes for forward osmosis water purification or desalination. Various modifications to and departures from the disclosed example embodiments will occur to those having ordinary skill in the art. The subject matter that is intended to be within the spirit of this disclosure is set forth in the following claims.

What is claimed is:

1. A system for purifying water, the system comprising:
a feed solution source;
a draw solution source;
a semipermeable membrane comprising a feed side for receiving, from the feed solution source, a feed solution stream having a first osmotic pressure and a draw side for receiving, from the draw solution source, a liquid draw solution stream comprising a liquid draw solute and having a second osmotic pressure, wherein a diluted draw solution stream is produced when water passes from the feed solution stream to the draw side via the semipermeable membrane;
a first heat exchanger to heat the diluted draw solution stream;
a coalescer configured to agglomerate the draw solute in the diluted draw solution stream to produce an agglomerated two phase effluent stream comprising a liquid phase of agglomerated draw solute and a liquid phase of water;
a liquid phase separator capable of separating two or more immiscible liquids or solutions, the liquid phase separator configured to separate the agglomerated draw solute from the agglomerated two phase effluent stream to produce a water rich stream comprising water and residual draw solute, and a solute rich stream comprising the agglomerated draw solute and water;
a second heat exchanger for cooling the water rich stream to produce a cooled single phase water rich stream; and
a filtration module for separating the residual draw solute from the cooled single phase water rich stream to produce a residual draw solute stream and a purified water product stream.

2. The system of claim 1, wherein the filtration module is selected from the group consisting of a nanofilter, and ultrafilter, and a reverse osmosis module.

3. The system of claim 1, wherein the liquid phase separator is a temperature controlled gravity phase separator.

4. The system of claim 1, wherein the liquid phase separator is a centrifuge.

5. The system of claim 1, wherein the liquid phase separator is a hydro-cyclone.

6. The system of claim 1, wherein the feed solution stream comprises salt water, brackish water or sea water.

7. The system of claim 1, wherein the feed solution stream comprises contaminated water.

8. A system for purifying water, the system comprising:
a feed solution source;
a draw solution source;
a forward osmosis module comprising:
   a semipermeable membrane comprising a feed side for receiving a feed solution source, a feed solution having a first osmotic pressure and a draw side for receiving, from the draw solution source, a liquid draw solution stream comprising a liquid draw solute and having a second osmotic pressure, wherein the semipermeable membrane is configured to pass water from the feed solution stream to the draw side to produce a diluted draw solution stream;
a first heat exchanger network for heating the diluted draw solution stream to induce phase separation and create a two phase effluent;
a coalescer for agglomerating the draw solute in the diluted draw solution stream to produce an agglomerated two phase effluent stream comprising a liquid phase of agglomerated draw solute and a liquid phase of water;
a gravity phase separator for separating the agglomerated draw solute from the two phase agglomerated effluent stream to produce a water rich stream comprising water and residual draw solute, and a solute rich stream comprising agglomerated draw solute and water;
a second heat exchanger network configured for cooling the water rich stream to produce a cooled single phase water rich stream; and
a filtration module configured for separating the residual draw solute from the cooled single phase water rich stream to produce a residual draw solute stream and a purified water product stream.

9. The system of claim 8, further comprising:
a mixer downstream of the filtration module, for combining the solute rich stream with the cooled solute rich stream exiting the second heat exchanger network to create a combined solute rich stream.

10. The system of claim 9, wherein a concentration of solute in the dilute draw solution stream is controlled using a flow rate of the dilute draw solution stream or a flow rate of the combined solute rich stream.

11. The system of claim 8, wherein the first exchanger network comprises one or more heat exchangers configured in series or parallel for increasing the temperature of the dilute draw solution.

12. The system of claim 8, wherein the coalescer comprises:
an upper section having hydrophobic coalescing elements for agglomerating the draw solute; and
a lower section comprising hydrophilic coalescing elements for water aggregation.

13. The system of claim 8, wherein the coalescer and gravity phase separator are heated to an operating temperature with an external heat source.

14. The system of claim 8, wherein the coalescer and gravity phase separator are located within a single device.

15. The system of claim 8, wherein a microorganism concentration in the dilute draw solution stream is controlled with a UV sterilizer or by addition of a biocide.

16. An apparatus for purifying water comprising:
a semipermeable membrane comprising a feed side for receiving a feed solution stream having a first osmotic pressure and a draw side for receiving a liquid draw solution stream comprising a liquid draw solute and having a second osmotic pressure, wherein the semipermeable membrane is configured to pass water from the feed solution stream to the draw side to produce a diluted draw solution stream;
a first heat exchanger to heat the diluted draw solution stream;
a coalescing region in which agglomeration of the draw solute in the diluted draw solution stream occurs to produce an agglomerated two phase effluent stream comprising a liquid phase of agglomerated draw solute and a liquid phase of water, the coalescing region comprising an upper section having hydrophobic coalescing elements for agglomerating the draw solute and a lower section comprising hydrophilic coalescing elements for water aggregation;
a liquid phase separator configured to separate the agglomerated draw solute from the agglomerated two phase effluent stream to produce a water rich stream comprising water and residual draw solute, and a solute rich stream comprising agglomerated draw solute and water;
a second heat exchanger to cool the water rich stream to produce a cooled single phase water rich stream; and
a filtration module to separate the residual draw solute from the cooled single phase water rich stream to produce a residual draw solute stream and a purified water product stream.

17. The apparatus of claim 16, wherein the coalescing region comprises a surface within the heat exchanger network and a section of piping between the heat exchanger network and the liquid phase separator.

18. The apparatus of claim 16, wherein the liquid phase separator is a temperature controlled gravity phase separator.

19. The apparatus of claim 16, wherein the liquid phase separator is a centrifuge.

20. The apparatus of claim 16, wherein the liquid phase separator is a hydro-cyclone.

* * * * *